(12) United States Patent
Kay et al.

(10) Patent No.: US 7,948,450 B2
(45) Date of Patent: May 24, 2011

(54) APPARATUS AND METHOD FOR ALLOWING DISPLAY MODULES TO COMMUNICATE INFORMATION ABOUT THEMSELVES TO OTHER DISPLAY MODULES IN THE SAME DISPLAY PANEL

(75) Inventors: Jason E. Kay, Belgrade, MT (US); Bryan L. Robertus, Bozeman, MT (US); Brett D. Swimley, Bozeman, MT (US); Jason A. Daughenbaugh, Bozeman, MT (US); Jon D. Koon, Bozeman, MT (US); Anthony J. Lukes, Bozeman, MT (US)

(73) Assignee: D3 LED, LLC, Union City, NJ (US)

( * ) Notice: Subject to any disclaimer, the term of this patent is extended or adjusted under 35 U.S.C. 154(b) by 898 days.

(21) Appl. No.: 11/558,014

(22) Filed: Nov. 9, 2006

(65) Prior Publication Data

US 2008/0114476 A1 May 15, 2008

(51) Int. Cl.
*G09G 5/00* (2006.01)
(52) U.S. Cl. ............................ 345/1.3; 345/1.1; 345/1.2
(58) Field of Classification Search .................... 345/1.3, 345/1.2, 1.1
See application file for complete search history.

(56) References Cited

U.S. PATENT DOCUMENTS

| | | | | | |
|---|---|---|---|---|---|
| 4,562,450 | A | * | 12/1985 | Ellis et al. | 345/68 |
| 4,566,004 | A | * | 1/1986 | Emerson | 345/68 |
| 4,924,410 | A | * | 5/1990 | Hamada | 345/1.1 |
| 5,283,861 | A | * | 2/1994 | Dangler et al. | 715/740 |
| 5,583,754 | A | | 12/1996 | Leonhardt et al. | |
| 5,790,371 | A | * | 8/1998 | Latocha et al. | 361/679.32 |
| 5,963,200 | A | * | 10/1999 | Deering et al. | 345/213 |
| 5,970,105 | A | * | 10/1999 | Dacus | 375/344 |
| 5,986,622 | A | * | 11/1999 | Ong | 345/1.1 |
| 6,489,937 | B1 | | 12/2002 | Ruvinsky | |
| 6,501,441 | B1 | * | 12/2002 | Ludtke et al. | 345/1.1 |
| 6,583,771 | B1 | * | 6/2003 | Furuhashi et al. | 345/1.1 |
| 6,661,425 | B1 | * | 12/2003 | Hiroaki | 345/629 |
| 6,674,424 | B1 | * | 1/2004 | Fujioka | 345/157 |
| 6,714,172 | B2 | * | 3/2004 | Matsuzaki et al. | 345/1.1 |
| 6,741,222 | B1 | * | 5/2004 | Tucker | 345/1.1 |
| 6,859,219 | B1 | * | 2/2005 | Sall | 345/1.1 |
| 6,999,045 | B2 | * | 2/2006 | Cok | 345/1.3 |
| 7,019,713 | B2 | * | 3/2006 | Hereld et al. | 345/1.1 |
| 7,029,124 | B2 | * | 4/2006 | Dubin et al. | 353/69 |
| 7,057,590 | B2 | | 6/2006 | Lim et al. | |
| 7,071,894 | B1 | * | 7/2006 | Thielemans et al. | 345/1.1 |
| 7,358,929 | B2 | * | 4/2008 | Mueller et al. | 345/1.3 |
| 7,453,418 | B2 | * | 11/2008 | Palmquist | 345/1.1 |

(Continued)

*Primary Examiner* — Amare Mengistu
*Assistant Examiner* — Gene W Lee
(74) *Attorney, Agent, or Firm* — Antoinette M. Tease

(57) ABSTRACT

An apparatus for allowing display modules to communicate information about themselves to other display modules in the same display panel, comprising a module-based display panel wherein each face of the panel comprises a plurality of display modules, wherein the transmitters, receivers and/or transceivers are configured so that each transmitter or transceiver on a given display module is adjacent to a receiver or transceiver on an adjacent display module, wherein the transmitters or transceivers on a given display module transmit information about that display module to the adjacent receivers or transceivers, wherein the receivers or transceivers on a given display module receive information about the adjacent display module from the adjacent transmitters or transceivers, and wherein the information is used by the display modules and/or a main controller to determine the location of the display module within a display panel.

20 Claims, 7 Drawing Sheets

Face 1

Face 2

Sign Faces

U.S. PATENT DOCUMENTS

| | | | |
|---|---|---|---|
| 7,592,970 B2* | 9/2009 | Matthies et al. | 345/1.3 |
| 2002/0027533 A1* | 3/2002 | Shishida et al. | 345/1.3 |
| 2002/0039084 A1* | 4/2002 | Yamaguchi | 345/1.1 |
| 2003/0061409 A1 | 3/2003 | RuDusky | |
| 2003/0098820 A1* | 5/2003 | Someya et al. | 345/1.3 |
| 2003/0146882 A1* | 8/2003 | Ogino et al. | 345/1.1 |
| 2003/0210209 A1* | 11/2003 | Lagarrigue et al. | 345/1.3 |
| 2004/0008155 A1* | 1/2004 | Cok | 345/1.3 |
| 2004/0036662 A1* | 2/2004 | Sakumura | 345/1.3 |
| 2004/0085256 A1* | 5/2004 | Hereld et al. | 345/1.1 |
| 2004/0090391 A1* | 5/2004 | Kondo | 345/1.1 |
| 2004/0150581 A1* | 8/2004 | Westerinen et al. | 345/1.3 |
| 2004/0233125 A1* | 11/2004 | Tanghe et al. | 345/1.3 |
| 2005/0030255 A1* | 2/2005 | Chiu et al. | 345/1.3 |
| 2005/0093006 A1 | 5/2005 | Lim et al. | |
| 2005/0093768 A1* | 5/2005 | Devos et al. | 345/1.3 |
| 2005/0128100 A1 | 6/2005 | Petrocy | |
| 2005/0134525 A1* | 6/2005 | Tanghe et al. | 345/1.1 |
| 2005/0156810 A1* | 7/2005 | Zerphy et al. | 345/1.1 |
| 2006/0001595 A1* | 1/2006 | Aoki | 345/1.2 |
| 2006/0007052 A1* | 1/2006 | Nakamura et al. | 345/1.2 |
| 2006/0030951 A1 | 2/2006 | Davlin et al. | |
| 2006/0033712 A1* | 2/2006 | Baudisch et al. | 345/157 |
| 2006/0044215 A1* | 3/2006 | Brody et al. | 345/1.3 |
| 2006/0164326 A1* | 7/2006 | Date | 345/1.3 |
| 2006/0176240 A1* | 8/2006 | Nozaki et al. | 345/1.2 |
| 2007/0052617 A1* | 3/2007 | Hanson et al. | 345/1.3 |
| 2007/0065010 A1* | 3/2007 | Shie et al. | 382/173 |
| 2007/0120762 A1* | 5/2007 | O'Gorman | 345/1.1 |
| 2007/0132659 A1* | 6/2007 | Maruyama et al. | 345/1.1 |
| 2007/0159413 A1* | 7/2007 | Thorjussen et al. | 345/1.3 |
| 2007/0164924 A1* | 7/2007 | Anderson et al. | 345/1.1 |
| 2007/0241988 A1* | 10/2007 | Zerphy et al. | 345/1.1 |
| 2007/0252779 A1* | 11/2007 | Nishiyama et al. | 345/1.1 |
| 2007/0279314 A1* | 12/2007 | Brown | 345/1.1 |
| 2007/0279315 A1* | 12/2007 | Laves et al. | 345/1.1 |
| 2007/0285341 A1* | 12/2007 | Manning | 345/1.3 |
| 2007/0285342 A1* | 12/2007 | Morikawa et al. | 345/1.3 |
| 2008/0068287 A1* | 3/2008 | Day et al. | 345/1.2 |
| 2008/0284677 A1* | 11/2008 | Whitehead et al. | 345/1.3 |
| 2009/0016806 A1* | 1/2009 | Wolf et al. | 403/24 |

* cited by examiner

Figure 1 – Transmitter and Receiver Locations on Display Module

Figure 2 - Transmitter Circuit Diagram

Figure 3 - Receiver Circuit Diagram

Figure 4 - Sign Faces

APPARATUS AND METHOD FOR ALLOWING DISPLAY MODULES TO COMMUNICATE INFORMATION ABOUT THEMSELVES TO OTHER DISPLAY MODULES IN THE SAME DISPLAY PANEL

BACKGROUND OF THE INVENTION

1. Field of the Invention

The present invention relates generally to the field of display panels, and more specifically, to an apparatus and method for allowing display modules to communicate information about themselves to other display modules in the same display panel.

2. Description of the Related Art

Most electronic signs or display panels today are based on a modular construction, that is, they are comprised of a plurality of display modules. LED is the dominant technology used in full-color outdoor display panels; however, there are other types of display technologies—such as plasma, LCD (liquid crystal display) and CRT (cathode ray tube)—that are also based on a modular design. The challenge with any of these modular display panels is ascertaining where each module is relative to the other modules so that the controller can send the appropriate video data to the correct module.

Existing methods of dealing with this problem include the use of: (1) specific cabling; (2) daisy chain cabling; (3) module address switch; (4) module address programming; and (5) a software configuration file. Each of these methods, and its shortcomings, is discussed below.

The problem with specific cabling is that each module has to have its own special cable. A burden is therefore placed upon the installer to connect each module to its specific cable. In large display panels with hundreds of cables, wiring errors are common and difficult to find and correct.

With daisy chain cabling, the controller is connected to the first module, which is connected to the second module, which is connected to the third module, etc. Daisy chain cabling is not very flexible and requires specific cabinet layouts. Often times cabinet designs or display panel configurations are not optimal for the number of modules on a chain, requiring additional controllers. Another problem with daisy chain cabling is that if a module fails, all other modules connected to it downstream will also lose data, causing a large portion of the display panel to fail when only one module has failed. Furthermore, daisy chaining modules creates electrical signal integrity problems since a large amount of data must pass through each module to get to the next one.

Another method for solving the problem of ascertaining where each display module is located relative to other display modules is to associate a switch (preferably a DIP (dual in-line package) or rotary switch) with each module. Each switch is uniquely set for each module by a technician. The switch settings must be correctly set in order to identify the position of the module in the display panel, and the setting typically constitutes a row and column assignment. The problem with this method is that the burden for correctly setting the switches falls on the installer. With large display panels consisting of hundreds of modules, this can be a tedious and error prone method of configuring the display panel. Furthermore, it is time-consuming.

Yet another method for solving the problem of mapping displaying modules on a display panel is to use module address programming. Module address programming involves programming each module with an external device or via a control panel physically located on the module itself. This method is obviously labor-intensive and prone to human error.

Finally, a software configuration file can be used to map the location of display modules on a display panel. This method assigns to each module its own unique address, which is usually programmed at the factory. A technician then enters these addresses into a software configuration file, and a main controller reads the software configuration file to generate a lookup table to determine the coordinate location of each module.

Although manual creation of the controller software configuration file works, it can take a single technician two to three hours to fully populate the configuration file with coordinates and corresponding display module addresses before the display panel can be tested and installed. As the overall dimensions of the display panel increase, the size of the configuration file must also increase; some larger display panels require over 2000 separate entries in the configuration file. Due to the sheer number of entries and the potential complexity of the display module addressing scheme, manual entry of display module addresses and coordinates is prone to error. If a single character is transposed or typed incorrectly in a module address or x-y coordinate, the display panel will display image information incorrectly. Debugging these errors is difficult and time-consuming, often requiring a technician to repeat the same process he or she used to create the configuration file in the first place.

If the process of creating the configuration file is cumbersome, maintenance of the configuration file after the display panel has been installed can be equally complicated. When an LED display module fails, an electrician or other sign technician must manually replace it. Because each display module has its own unique address, the technician must update the configuration file to match existing display panel coordinates with the address of the new display module. This means the technician must manually record the address of the old and new circuit boards while in the field, and then gain access to the controller software's configuration file to replace the address of the old display module with the address of the new one. This manual process is susceptible to recording or input error and is complicated by the fact that the individual replacing the display module in the field may not have either the computer expertise or the physical access to the controller software to update the configuration file successfully.

What is needed is an automated method to populate the configuration file of the display panel's controller software with the identifiers and associated x-y coordinates of each display module in the display panel. Such a solution would eliminate the manual steps required to create the controller software configuration file, both when populating it before installation of the display panel and when updating it during maintenance following deployment.

BRIEF SUMMARY OF THE INVENTION

The present invention is an apparatus for allowing display modules to communicate information about themselves to other display modules in the same display panel, comprising a module-based display panel, wherein the display panel comprises one or more faces, wherein each face comprises a plurality of display modules, wherein each display module comprises at least three borders, wherein at least one of the borders is adjacent to another display module, wherein a transmitter, receiver or transceiver is located on each border that is adjacent to another display module, wherein the transmitters, receivers and/or transceivers are configured so that each transmitter or transceiver on a given display module is adjacent to a receiver or transceiver on an adjacent display module, wherein the transmitters or transceivers on a given display module transmit information about that display module to the adjacent receivers or transceivers, wherein the receivers or transceivers on a given display module receive information about the adjacent display module from the adjacent transmitters or transceivers, and wherein the information is used by the display modules and/or a main controller to determine the location of the display module within a display panel.

In a preferred embodiment, the transmitters, receivers and/or transceivers communicate information using LC resonator circuits to generate alternating magnetic fields between adjacent display modules. Preferably, the information that is transmitted and received between adjacent display modules is identifier information. The identifier information from the display modules is preferably transmitted to a sign mapping software program that maps the location of the display modules on the display panel. The sign mapping software program preferably discovers all separate sign faces and assigns x-y coordinates to every display module in each sign face.

In a preferred embodiment, the x-y coordinates that are assigned to each display module by the sign mapping software program are converted to actual x-y coordinates, and the actual x-y coordinates are converted to video coordinates.

The present invention also covers a method for allowing display modules to communicate information about themselves to other display modules in the same display panel, comprising: wherein a display panel comprises one or more faces, wherein each face comprises a plurality of display modules, wherein each display module comprises at least three borders, wherein at least one of the borders on each display module is adjacent to another display module, locating a transmitter, receiver or transceiver on each border that is adjacent to another display module; and configuring the transmitters, receivers and/or transceivers so that each transmitter or transceiver on a given display module is adjacent to a receiver or transceiver on an adjacent display module; wherein the transmitters or transceivers on a given display module transmit information about that display module to the adjacent receivers or transceivers, wherein the receivers or transceivers on a given display module receive information about the adjacent display module from the adjacent transmitters or transceivers, and wherein the information is used by the display modules and/or a main controller to determine the location of the display module within a display panel.

In a preferred embodiment, the method further comprises using LC resonator circuits to communicate information between the transmitters, receivers and/or transceivers by generating alternating magnetic fields between adjacent display modules. Preferably, the information that is transmitted and received between adjacent display modules is identifier information. The identifier information from the display modules is preferably transmitted to a sign mapping software program that maps the location of the display modules on the display panel. The sign mapping software program preferably discovers all separate sign faces and assigns x-y coordinates to every display module in each sign face.

In a preferred embodiment, the x-y coordinates that are assigned to each display module by the sign mapping software program are converted to actual x-y coordinates, and the actual x-y coordinates are converted to video coordinates.

REFERENCE NUMBERS

1 Top display module transmitter
2 Right display module receiver
3 Bottom display module receiver
4 Left display module transmitter

DETAILED DESCRIPTION OF INVENTION

The present invention allows the individual display modules of a module-based display panel to communicate with adjacent display modules to share information. In the preferred embodiment, each display module shares its identifier information with display modules adjacent to its left and top borders.

In the preferred embodiment, as each display module receives identifier information from neighboring modules located to its right and bottom, it uses known communication mechanisms to send this identifier information—plus its own identifier—to the display panel's main control module, which in turn sends the data to the display panel's controller software.

The present invention includes software code that interprets the identifier data collected from the individual display modules to calculate the position of each display module in the display panel and associate its identifier with the appropriate x-y coordinates. Once the software calculates this information, a sign technician can save the information in the controller software's configuration file, eliminating the need to collect and update this information manually.

The present invention comprises a hardware component and a software component, both of which are described more fully below.

A. Hardware

To allow the display modules to communicate information with one another, each display module is preferably equipped with two transmitters and two receivers. In an alternate embodiment, the display module is equipped with one or more transceivers in lieu of one or more of the transmitters and/or receivers. For purposes of illustration, the following description will refer to transmitters and receivers; however, a transceiver could be used in place of any or all of the transmitters and receivers.

Figure 1:
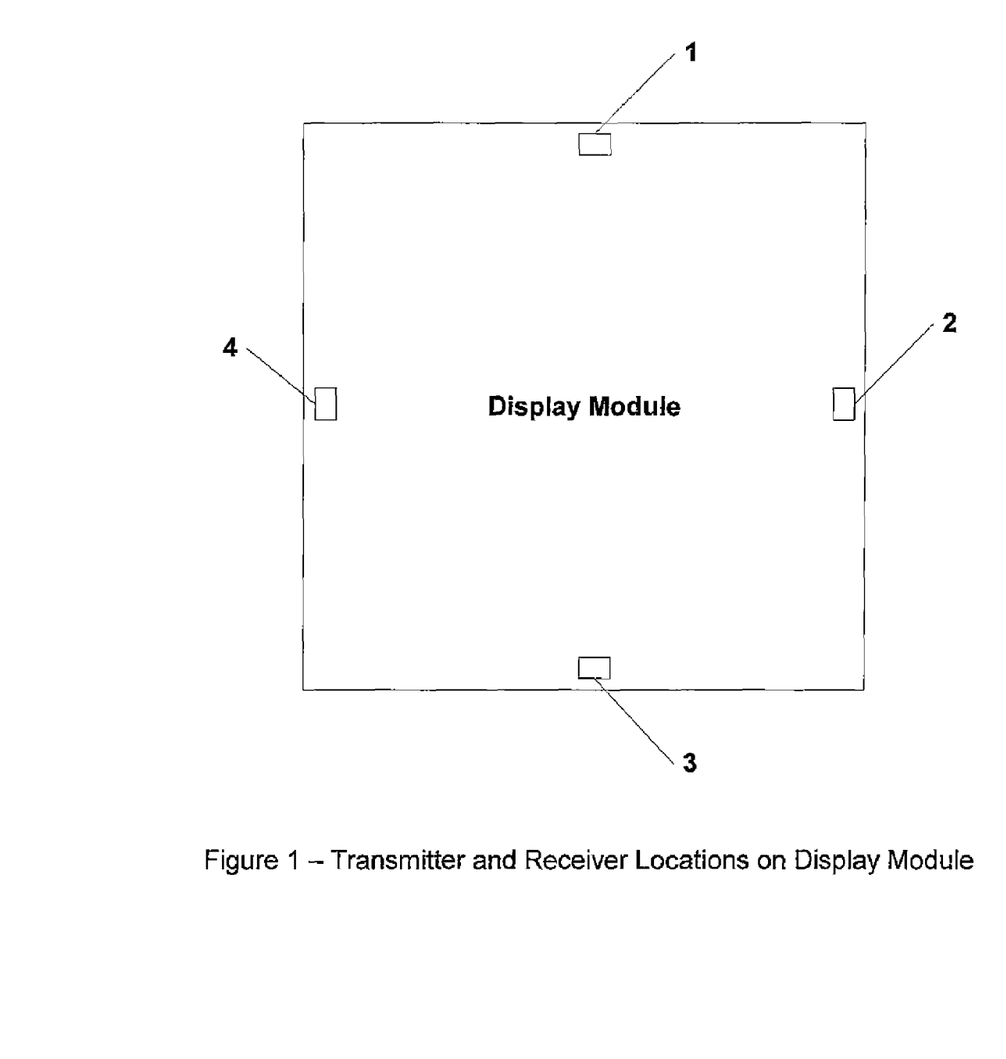
FIG. 1 is a diagram of one embodiment of the present invention in which a display module has four borders and is equipped with two transmitters and two receivers.

As shown in FIG. 1, one transmitter is located on the top border of the display module (1), while the second transmitter is located on the display module's left border (4). The first receiver is located on the display module's right border (2), while the second receiver is located on the display module's bottom border (3). With this configuration, a display module's transmitters are adjacent to the receivers of the display module next to it. This allows a display module to communicate information about itself to the display module above it and to its left; it learns about display modules located to its right and below it.

In a preferred embodiment of the present invention, the transmitters and receivers communicate information using LC (inductor/capacitor) resonator circuits to generate alternating magnetic fields between adjacent display modules. This approach is advantageous because of its low cost, its low Electromagnetic Interference (EMI), and the fact that it requires no change to the display module installation process. Other preferred embodiments to allow communication between display modules could include wired connections or short-distance wireless communication mechanisms such as Infrared (IR), Bluetooth, or Radio Frequency Identification (RFID).

In a preferred embodiment, each display module transmits an identification packet to its neighbors every ten seconds using On-Off Keying (OOK). Circuit board logic converts information to be transmitted in this information packet into electromagnetic pulses that are sent via the LC resonator circuit to the receiving display module. Logic on the receiving display module converts the received signals to a binary format that can be used to "read" the information sent across the connection. In the preferred embodiment, this communicated information is the identifier of the transmitting display module. In other preferred embodiments, the communication mechanism of the present invention can be used to send diagnostic data or other information of interest from one display module to another. Table 1 shows the format of the communication packets in the present embodiment.

TABLE 1

Communication Packet Structure

| Name | Identifier | Bits | Description |
| --- | --- | --- | --- |
| START_CODE | 0x00-0x01 | 15-0 | 0xA5C3: used to verify packet start. |
| MAC | 0x02-0x07 | 47-0 | Module identifier |
| MAC_XSUM | 0x08-09 | 15-0 | 16-bit checksum over the module identifier field. IP checksum algorithm - RFC 791/768 |

The preferred embodiment uses serial communication between the display modules with a baud rate of 1000 bps and one start bit, 8 data bits and one stop bit.

Figure 2:
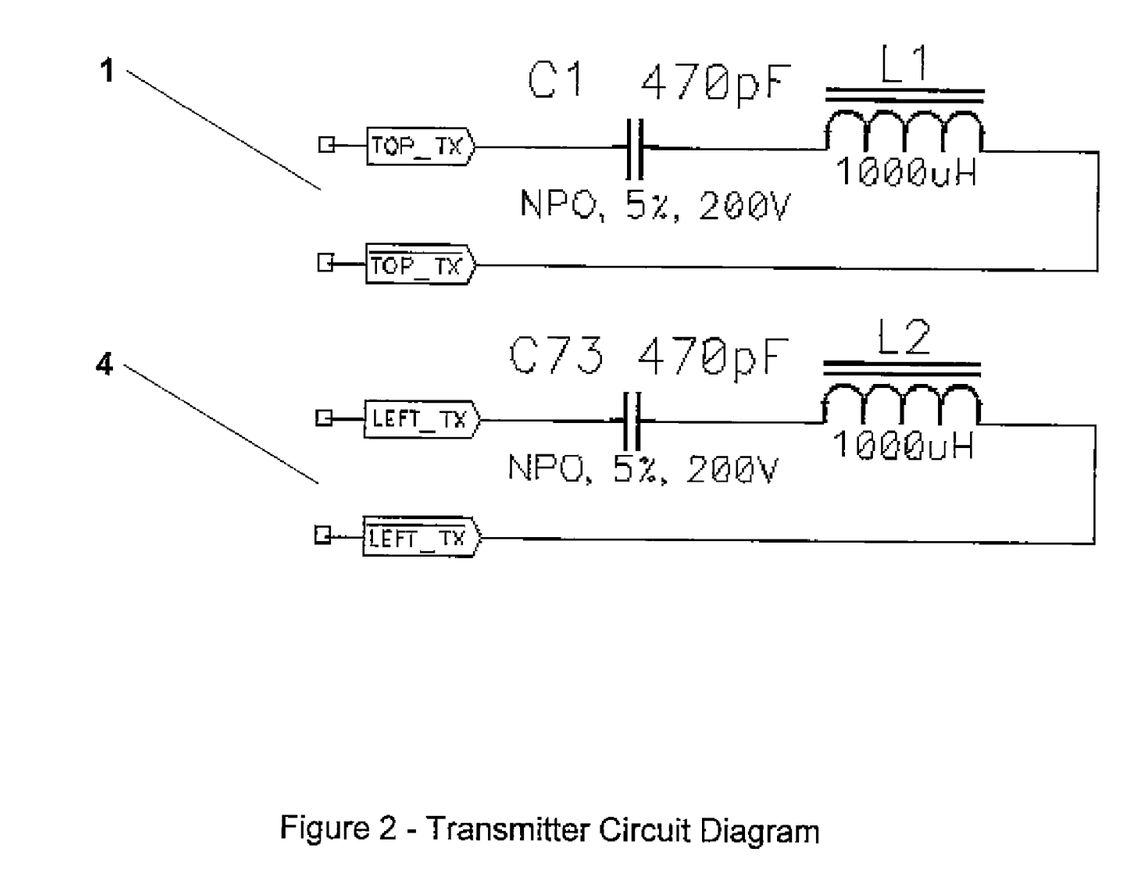
FIG. 2 is a diagram of the transmitter circuit of the present invention.

The LC circuits have a resonance frequency set by the inductance of the inductor and the capacitance of the capacitor. FIG. 2 shows the transmitter circuit of the present invention. The transmitter circuit drives both ends of the LC circuit with opposite levels of 3.3V CMOS logic to effectively generate a 6.6V square wave, driven at the resonant frequency. The circuit can store this energy because the wave is driven at the resonant frequency. The amplitude increases until the energy losses equal the energy added, resulting in large transmit signal strength.

Figure 3:
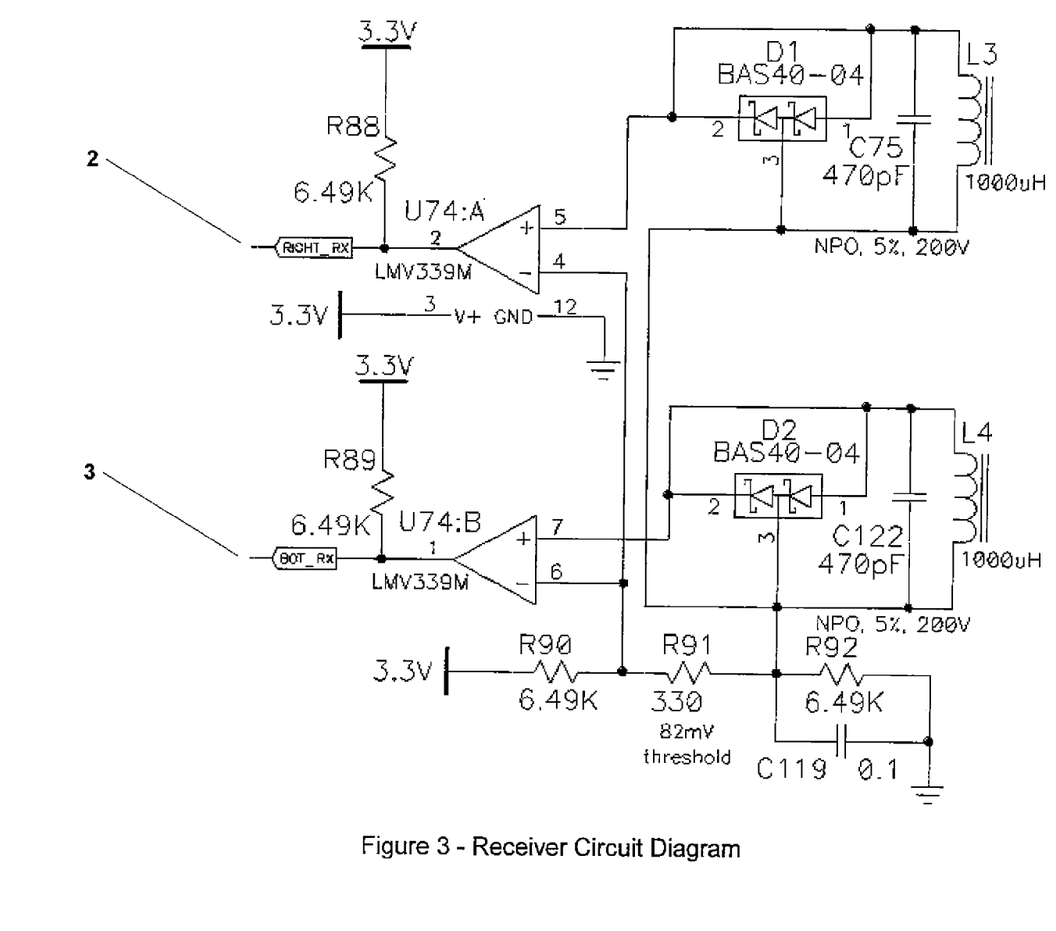
FIG. 3 is a diagram of the receiver circuit of the present invention.

FIG. 3 shows the receiver circuit of the present invention. The receiver circuit includes an LC circuit that absorbs energy from the alternating magnetic field generated by the transmitter. One side of the resonator is biased to approximately 1.6V, and a set of Schottky diodes limits the amplitude from getting too large. A comparator compares the resonator voltage to a threshold voltage of approximately 82 mV. If no or very little signal is present (less than the threshold voltage), the comparator will not trip and the output remains low. If the signal is of sufficient amplitude to tip the comparator, the comparator will output a square wave at the resonance (carrier) frequency. Circuit board logic processes the output of the receiver circuit to detect the presence of the square wave and convert it to binary format. An active square wave indicates a binary value of "0," while an idle signal indicates a binary value of "1." Using this method, the receiving display module converts the square waves sent by the transmitting display module into binary data that contains information: in this case, the identifier of the transmitting display module.

After using the communication mechanism of the present invention to learn the identifiers of the display modules located on its right and bottom borders, each display module stores the identifiers of its neighbors in memory. When polled, each display module sends this stored identifier information—along with its own identifier—to the display panel's main controller. The main controller can then pass this collected information to the software algorithm that maps the location of the display modules on the display panel. Alternatively, each module could immediately send identifier information to the controller without storing in memory, either autonomously or in response to a poll. Another alternative would be for each module to broadcast the identifier information to all other modules in the display. Each module could then determine its own position in the display panel using the information received without intervention from the controller.

The above discussion assumes that a display module has four borders (top, right, left and bottom); however, the present invention also works with display modules that have three borders. In the case of a display module with three borders, a transceiver would be located on each border of the display module that is adjacent to another display module. The present invention would work as described above in all other respects.

B. Software

Figure 4:
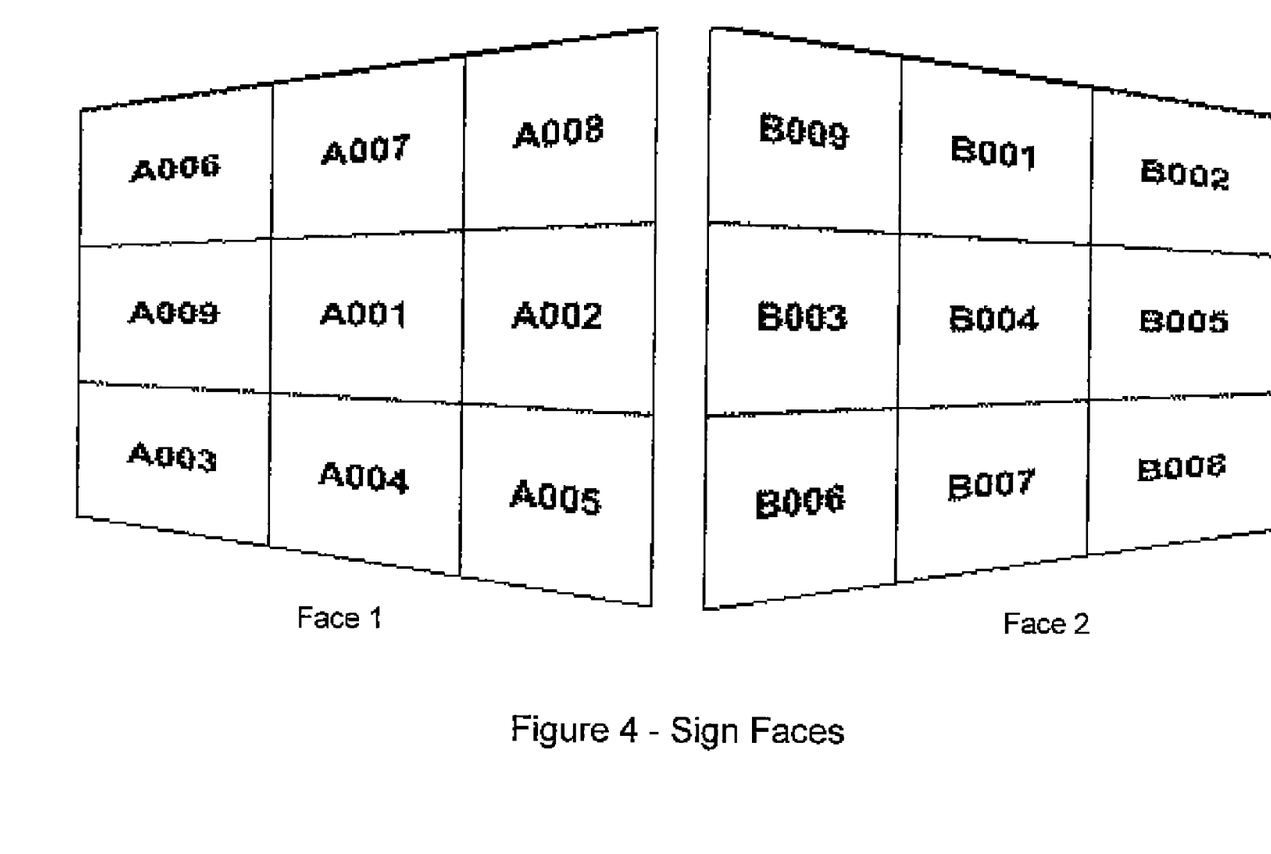
FIG. 4 is a diagram of a display panel with two faces.

The sign mapping software of the present invention accepts collected identifier information and processes it to determine the x-y coordinates of each display module on one or more sign 'faces.' A display panel may have multiple screens, or faces, as shown in FIG. 4. A face is a grouping of display modules that are physically contiguous; faces are not physically contiguous to each other and may or may not display the same video data as other faces in the display panel.

The present invention will work with any sign mapping software program that can take the information from the receivers or transceivers located on the display modules and use that information to map the location of the display modules on the display panel. Thus, the present invention is not limited to any particular type of sign mapping software program, as long as it accomplishes this function. The discussion below is intended to describe one possible version of the sign mapping software program.

In a preferred embodiment of the software, the display modules report their identifier information back to the software. This identification information includes the module ID itself ("me"), as well as ID information for a module to the right of the module (if detected) and ID information for a module below the module (if detected). A list is then built of this module information, and all elements in the list ("module list elements") are initialized to indicate that coordinate information has not been assigned to the module associated with the list element (e.g., coordinatesValid=false). The module list element includes coordinate information (x and y), face ID information, and coordinate validity information (which indicates whether coordinates have been assigned to that module).

Processing begins by initializing the first face identifier to zero (i.e., assigning an index or identifier of zero to the first face). Subsequent faces are preferably assigned face identifiers in increments of one (1, 2, 3, etc.). The software then starts at the beginning of the list and examines the first module list element to determine whether coordinates have been assigned to that module. If a module list element is found with invalid coordinates (i.e., no coordinates assigned), then module coordinate processing begins for that module. If a module list element has valid coordinates (i.e., coordinates have been assigned to the module), then the next module list element in the list is examined in turn until the end of the list is encountered.

Once all of the module list elements contained within the list have been examined to determine coordinate validity, coordinates can be "corrected" and translated from module coordinates to video coordinates. Specifically, module coordinates are normalized such that the upper left module has coordinates (0,0), and module coordinates are converted to video (pixel) coordinates, as explained more fully below.

If the software encounters a module with invalid (i.e., unassigned) coordinates, the software algorithm assumes that this is the start of a new face and initializes the initial face coordinate values to (0,0). These initial coordinates are assigned to the first module comprising the face (which is the first module to be examined and not necessarily the module that ultimately ends up with coordinates (0,0) after correction).

The algorithm then attempts to see, in turn, if there is a module to the right, below, to the left, or above the current display module that does not have coordinates assigned. The first of these situations that is encountered (for example, if there is a module to the right of the current display module) causes the module processing to shift to the newly discovered module, with a change in the module's coordinates based upon the position of the new module. In other words, a module to the right has the x coordinate increased by one, below has y increased by one, to the left has x decreased by one, and above has y decreased by one.

Before processing shifts to this new module, however, the software algorithm saves the state of the next processing path that can be performed on the current module list element to a LIFO (Last In First Out) list of module "state" information records (also called a "stack"). This state information allows the algorithm to come back and pursue alternate module configuration processing paths on a face, in the event that a processing path comes to a dead end. For example, if a module is found to the right of a display module, the algorithm would "push" the state of the processing to indicate that the next processing to be performed would be below the current display module. The current module coordinates (x and y) are saved, as well as a reference to the current display module list element.

Once a processing path has been exhausted (e.g., there is no module to the right, below, to the left, or above the current display module), the processing stack for the face is examined. If stack is not empty, the last entry pushed (or added to the stack) is "popped" off (removed from) the stack, that record information is used to restore the processing state information for the module referenced by the stack record, and a new module processing path begins. In other words, the state information is used by the software to pick up where it left off in module processing. For example, if a module was being processed, and a module to the right was found, the processing path would follow the module to the right. The software needs to remember, however, that other processing paths (above, below and to the left of the current module) are still available for processing. Ultimately, if no module list elements are left on the stack, then the algorithm assumes that all the processing that can be performed on that face is completed, and it subsequently goes back to examine the overall module list to see if subsequent faces need to be processed.

When all of the faces in the display panel have been processed, then the software performs a coordinate correction function. Each module has "module coordinates," which are relative to the first module in the face that was encountered (which is assigned module coordinates 0,0 by default). Note that a module's coordinates may be negative in both coordinate axes.

The software then "normalizes" the coordinates for a face, such that the module with the most negative coordinates (preferably the module in the upper left-hand corner of the face) is normalized to coordinates (0,0), and other modules that comprise the face are reassigned module coordinates relative to this particular module. In this manner, all negative coordinates are eliminated.

After this is accomplished, the module coordinates are converted to video coordinates by multiplying each module's x coordinate by the module's width (in video pixels) and by multiplying each module's y coordinate by the module's height (in video pixels).

Figure 5:
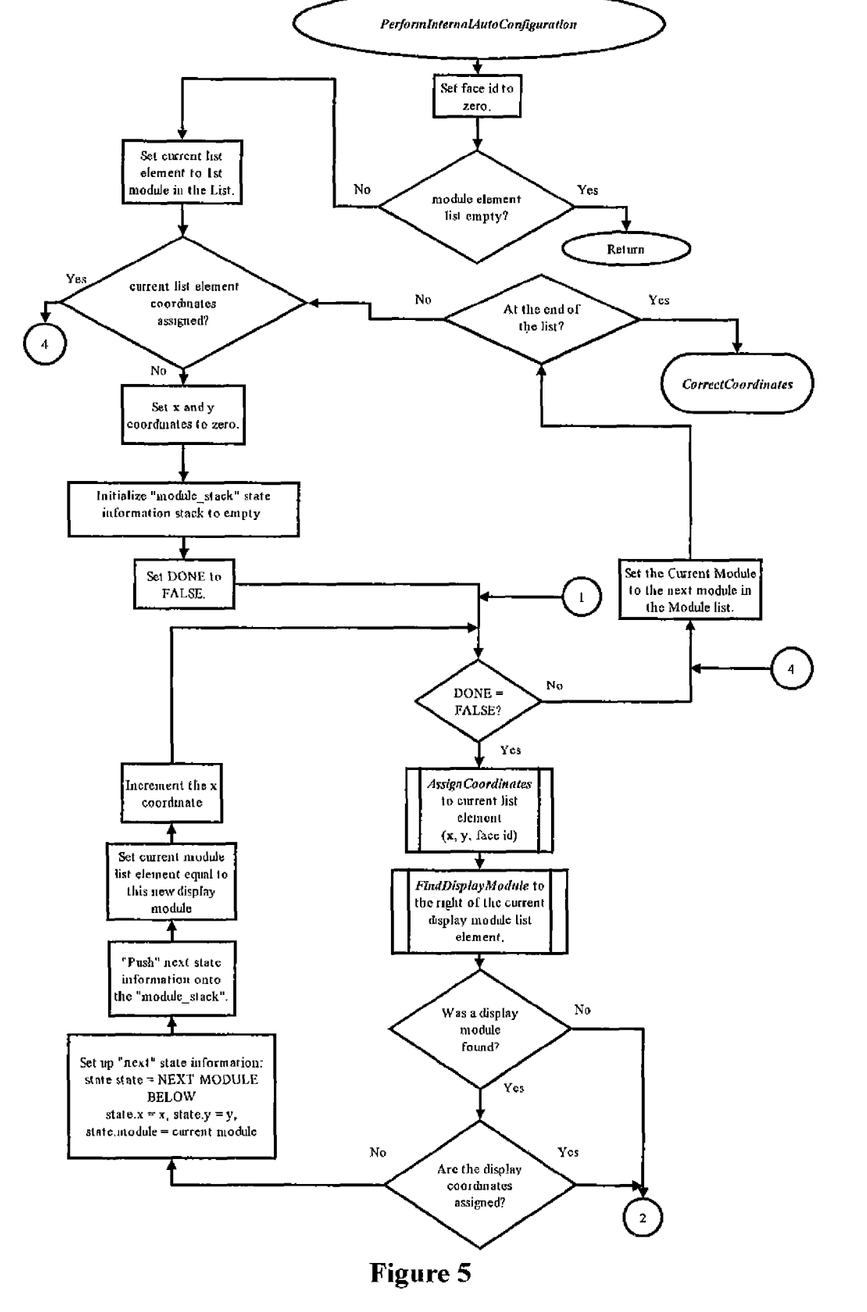
FIG. 5 is a flow diagram of one aspect of the software functionality of the present invention.

This process is explained more fully below in connection with FIG. 5-7. Referring to FIG. 5, upon execution of the PerformInternalAutoConfiguration algorithm, it is assumed that the list of module element information has been created, and that all module coordinate assignment information has been initialized to "unassigned." Starting at the top of FIG. 5, the software initializes the face ID to zero. The first decision box evaluates whether any module elements have been added to the list. If not, there is no further processing to be performed. Otherwise, the current module list element is set to the first element of the module list.

The element is examined to see if coordinates have been assigned. If so, the algorithm moves to the next element in the module element list and checks this element to see if coordinates have been assigned. This step is repeated in turn until a module is encountered that has unassigned coordinates, or until the end of the list is reached. When the end of the list is reached, all faces have been identified, and all relative coordinates of the modules that comprise the face have been assigned. The CorrectCoordinates algorithm is called to normalize module coordinates and to convert the module coordinates to video pixel coordinates. Otherwise, if an element is encountered with unassigned coordinates, it is assumed that this module is a member of a new face.

For the new face, x and y coordinate variables are initialized to zero to provide a reference for the initial coordinate assignment. The "module_stack" state information stack list is initialized to empty (e.g., no state information has been added to the stack list). The variable DONE is then initialized to FALSE, indicating that all processing paths for this face have not been completed. The current x and y coordinates are then assigned to this module list element.

The module element list is then examined to see if a module within the list has the same "me" module identifier as the current module's "right" identifier. If a module is found, this new module's coordinates are examined to see if they have been assigned. If not, the state information pertaining to the current module is saved by pushing state information that is comprised of the module list element reference, the current x and y coordinate values and the next processing path that needs to be evaluated for this module (in this case the NEXT MODULE BELOW the current module). The x coordinate is then incremented by one, indicating that the next module to be evaluated is to the right of the current module. The current module list element is then replaced by a reference to the new display module that has been found, and the algorithm jumps back to the point where x and y coordinates are assigned to the current module list element (connector designator 1 within FIG. 5).

Figure 6:
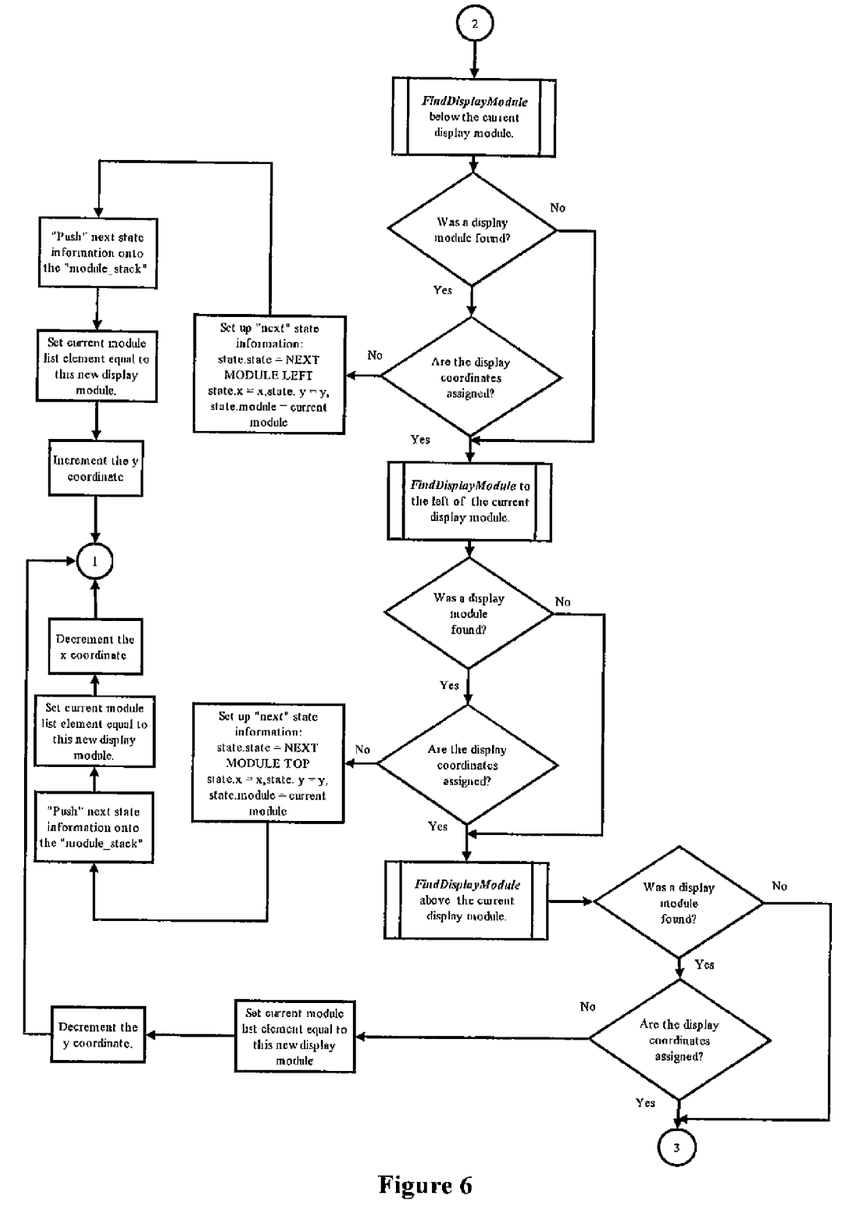
FIG. 6 is a flow diagram of yet another aspect of the software functionality of the present invention.

If no display module is found to the right of the current display module, or if a display module is found but its coordinates had already been assigned, the algorithm moves to connector designator 2, on the top of FIG. 6.

Beginning at connector designator 2 at the top of FIG. 6, the module element list is then examined to see if a module within the list has the same "me" module identifier as the current module's "below" identifier. If a module is found, this new module's coordinates are examined to see if they have been assigned. If not, the state information pertaining to the current module is saved by pushing state information that is comprised of a the module list element reference, the current x and y coordinate values and the next processing path that needs to be evaluated for this module (in this case the NEXT MODULE LEFT of the current module). The y coordinate is then incremented by one, indicating that the next module to be evaluated is below the current module. The current module list element is then replaced by a reference to the new display module that has been found, and the algorithm jumps back to the point where x and y coordinates are assigned to the current module list element (connector designator 1 within FIG. 5).

If no display module is found below the current display module, or if a display module is found but its coordinates have already been assigned, the module element list is then examined to see if a module within the list has a "right" module identifier that matches the current module's "me" identifier (a match indicates that the module found is to the left of the current module). If a module is found, this new module's coordinates are examined to see if they have been assigned. If not, the state information pertaining to the current module is saved by pushing state information that is comprised of the module list element reference, the current x and y coordinate values and the next processing path that needs to be evaluated for this module (in this case the NEXT MODULE ABOVE the current module). The x coordinate is then decremented by one, indicating that the next module to be evaluated is to the left of the current module. The current module list element is then replaced by a reference to the new display module that has been found, and the algorithm jumps back to the point where x and y coordinates are assigned to the current module list element (connector designator 1 within FIG. 5).

If no display module is found to the left of the current display module, or if a display module is found but its coordinates had already been assigned, the module element list is then examined to see if a module within the list has a "below" module identifier that matches the current module's "me" identifier (a match indicates that the module found is above the current module). If a module is found, this new module's coordinates are examined to see if they have been assigned. If not, the y coordinate is then decremented by one, indicating that the next module to be evaluated is above the current module (no processing path state information needs to be saved here because this processing path is the last that needs to be evaluated for the current module). The current module list element is then replaced by a reference to the new display module that has been found, and the algorithm jumps back to the point where x and y coordinates are assigned to the current module list element (connector designator 1 within FIG. 5).

Figure 7:
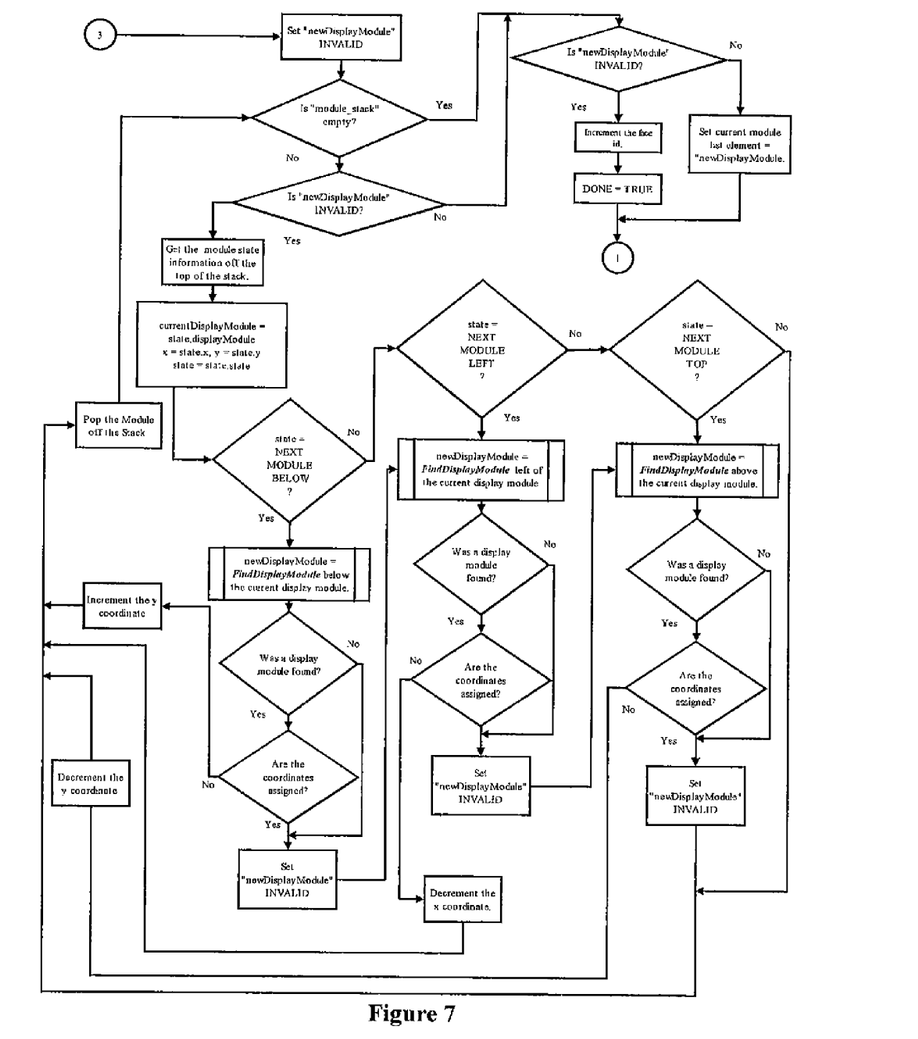
FIG. 7 is a flow diagram of yet another aspect of the software functionality of the present invention.

If no display module is found above the current display module, or if a display module is found but its coordinates have already been assigned, control passes to connector designator 3 at the top left of FIG. 7.

Beginning at connector designator 3 at the top left of FIG. 7, at this point in the algorithm, a single processing path has been exhausted. However, alternate processing paths may have been saved (pushed to the stack) for each module processed. These processing paths represent processing paths that have not yet been pursued.

A reference to a "newDisplayModule" is initially set to an INVALID reference, indicating that no suitable new processing path has been found. Note that the "newDisplayModule" reference will be set to a valid display module reference in the algorithm as described below, should a display module with a valid processing path be found.

The "module_stack" state information list is examined, and if it is empty, a check is executed to determine if a "newDisplayModule" reference has been found, indicating a new processing path that can be pursued. If so, the current module list element is assigned to this "newDisplayModule," and the algorithm jumps back to the point where x and y coordinates are assigned to the current module list element (connect designator 1 within FIG. 5). Note that these x and y coordinates are based upon the state information retrieved from the "module_stack," described in more detail below.

If the "module_stack" is found to be empty (no state information elements are left in the list) and the "newDisplayModule" reference is INVALID, the algorithm assumes that all processing paths that could have been pursued for the current face are complete. The algorithm then increments the face ID by 1 (in anticipation of identifying another face) and sets the DONE flag to TRUE (indicating that the current face processing is complete). The algorithm then jumps to connector designator 1 within FIG. 5.

If the "module_stack" is not empty, state information from the first element off the stack is retrieved. Since the stack list is a LIFO (Last In First Out) stack, the state information from the last module processed will be retrieved. This state information represents an alternate processing path for a module that has not yet been explored, and may be available as a path for further module coordinate assignment.

The x and y coordinates for the display module are restored from the state information retrieved from the stack. These are the x and y coordinates that have already been assigned to the retrieved display module whose information has just been retrieved from the stack. The current module list element is then set to the list element reference contained within the state information retrieved from the stack. Next, the saved "state" variable is examined. This represents the next processing path that should be examined for the retrieved display module.

If the state is NEXT MODULE BELOW, the module element list is then examined to see if a module within the list has the same "me" module identifier as the current module's "below" identifier. If a module is found, this new module's coordinates are examined to see if they have been assigned. If not, the y coordinate is then incremented by one, indicating that the next module to be evaluated is below the current module, the "newDisplayModule" is set to the reference to the new display module that has been found, the current state information record is "popped" (removed) from the "module_stack," and the algorithm jumps back to the point where the module stack is examined to determine if it is "empty" (as described above).

If the state is NEXT MODULE LEFT, or the results of the NEXT MODULE BELOW examination either did not find a display module below the current module list element or a display module was found but already had coordinates assigned, the module element list is then examined to see if a module within the list has the same "right" module identifier as the current module's "me" identifier. If a module is found, this new module's coordinates are examined to see if they have been assigned. If not the x coordinate is then decremented by one, indicating that the next module to be evaluated is to the left of the current module, the "newDisplay-Module" is set to the reference to the new display module that has been found, the current state information record is "popped" (removed) from the "module_stack," and the algorithm jumps back to the point where the module stack is examined to determine if it is "empty" (as described above).

If the state is NEXT MODULE TOP, or the results of the NEXT MODULE LEFT examination either did not find a display module to the left of the current module list element or a display module was found but already had coordinates assigned, the module element list is then examined to see if a module within the list has the same "below" module identifier as the current module's "me" identifier. If a module is found, this new module's coordinates are examined to see if they have been assigned. If not, the y coordinate is then decremented by one, indicating that the next module to be evaluated is above the current module, the "newDisplayModule" is set to the reference to the new display module that has been found, the current state information record is "popped" (removed) from the "module_stack," and the algorithm jumps back to the point where the module stack is examined to determine if it is "empty" (as described above).

If the state is none of NEXT MODULE BELOW, NEXT MODULE LEFT, NEXT MODULE TOP, or the results of the NEXT MODULE LEFT examination either did not find a display module to the left of the current module list element or a display module was found but already had coordinates assigned, the "newDisplayModule" reference is set to INVALID, the current state information is "popped" (removed) from the "module_stack," and the algorithm jumps back to the point where the module state is examined to determine if it is "empty" (as described above).

Ultimately, if a "newDisplayModule" is found, the module processing information (current module list element, x and y coordinates) has been restored to the point that coordinates can be assigned to the new module, and processing can continue via the newly determined processing path.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for allowing display modules to communicate information about themselves to other display modules in the same display panel, comprising a module-based display panel,
    wherein the display panel comprises one or more faces,
    wherein each face comprises a plurality of display modules,
    wherein each display module comprises at least three borders,
    wherein at least one of the borders is adjacent to another display module,
    wherein a transmitter, receiver or transceiver is located on each border that is adjacent to another display module,
    wherein the transmitters, receivers and/or transceivers are configured so that each transmitter or transceiver on a given display module is adjacent to a receiver or transceiver on an adjacent display module,
    wherein each display module has a unique identifier,
    wherein the transmitters or transceivers on a given display module transmit that display module's unique identifier to the adjacent receivers or transceivers within a bandwidth of 10 Kbps or less,
    wherein the receivers or transceivers on a given display module receive the unique identifier of each adjacent display module from the adjacent transmitter[s] or transceiver[s] within a bandwidth of 10 Kbps or less,
    wherein each display module sends its own unique identifier and the unique identifiers of the adjacent display modules to a main controller, and
    wherein the unique identifiers are used by the main controller to determine the location of the display module within a display panel.

2. The apparatus of claim 1, wherein the transmitters, receivers and/or transceivers communicate information using LC resonator circuits to generate alternating magnetic fields between adjacent display modules.

3. The apparatus of claim 1, wherein the information that is transmitted and received between adjacent display modules is identifier information.

4. The apparatus of claim 3, wherein the identifier information from the display modules is transmitted to a sign mapping software program that maps the location of the display modules on the display panel.

5. The apparatus of claim 4, wherein the sign mapping software program discovers all separate sign faces and assigns x-y coordinates to every display module in each sign face.

6. The apparatus of claim 5, wherein the x-y coordinates that are assigned to each display module by the sign mapping software program are converted to actual x-y coordinates.

7. The apparatus of claim 6, wherein the actual x-y coordinates are converted to video coordinates.

8. A method for allowing display modules to communicate information about themselves to other display modules in the same display panel, comprising:
    (a) wherein a display panel comprises one or more faces, wherein each face comprises a plurality of display modules, wherein each display module comprises at least three borders, wherein at least one of the borders on each display module is adjacent to another display module, locating a transmitter, receiver or transceiver on each border that is adjacent to another display module; and
    (b) configuring the transmitters, receivers and/or transceivers so that each transmitter or transceiver on a given display module is adjacent to a receiver or transceiver on an adjacent display module,
    wherein each display module has a unique identifier,
    wherein the transmitters or transceivers on a given display module transmit that display module's unique identifier to the adjacent receivers or transceivers within a bandwidth of 10 Kbps or less,
    wherein the receivers or transceivers on a given display module receive the unique identifier of each adjacent display module from the adjacent transmitter[s] or transceiver[s] within a bandwidth of 10 Kbps or less,
    wherein each display module sends its own unique identifier and the unique identifiers of the adjacent display modules to a main controller, and
    wherein the unique identifiers are used by the main controller to determine the location of the display module within a display panel.

9. The method of claim 8, further comprising using LC resonator circuits to communicate information between the transmitters, receivers and/or transceivers by generating alternating magnetic fields between adjacent display modules.

10. The method of claim 8, wherein the information that is transmitted and received between adjacent display modules is identifier information.

11. The method of claim 10, wherein the identifier information from the display modules is transmitted to a sign mapping software program that maps the location of the display modules on the display panel.

12. The method of claim 11, wherein the sign mapping software program discovers all separate sign faces and assigns x-y coordinates to every display module in each sign face.

13. The method of claim 12, wherein the x-y coordinates that are assigned to each display module by the sign mapping software program are converted to actual x-y coordinates.

14. The method of claim 13, wherein the actual x-y coordinates are converted to video coordinates.

15. The apparatus of claim 1, wherein communication links between adjacent display modules are unidirectional only.

16. The apparatus of claim 1, wherein no data other than a start code header, the unique identifier of a given display module and a checksum is transmitted by that display module to an adjacent display module.

17. The apparatus of claim 1, wherein the unique identifier is a Media Access Control address.

18. The apparatus of claim 1, wherein the display modules do not process any location data.

19. The apparatus of claim 1, wherein the module comprises four borders,
wherein the apparatus requires only two transmitters and two receivers, and
wherein the two transmitters are located on two of the module borders, and the two receivers are located on the other two module borders.

20. The apparatus of claim 1, wherein the module comprises a first border, a second border, a third border and a fourth border, and
wherein a transmitter is located on the first border, a transmitter is located on the second border, a receiver is located on the third border, and a receiver is located on the fourth border.

\* \* \* \* \*